Patented Mar. 5, 1940

2,192,298

UNITED STATES PATENT OFFICE 2,192,298

PRODUCTION OF LEVULINIC AND HOMOLOGOUS ACIDS AND INTERMEDIATE COMPOUNDS FROM DIHALOGEN BUTENES

Donald D. Coffman, Lindamere, and Arnold M. Collins, Wilmington, Del., assignors to E. I. du Pont de Nemours & Company, Wilmington, Del., a corporation of Delaware No Drawing. Application August 14, 1936, Serial No. 96,050

22 Claims. (Cl. 260—486)

This invention relates to the synthesis of levulinic acid from certain dihalogenbutenes, to intermediate compounds formed in this synthesis, and to their preparation.

Levulinic acid is a well-known compound which has a number of uses. It is generally derived from sugars (hexoses) by long boiling with dilute mineral acids; it may also be synthesized by reacting chloracetic ester with the sodium derivative of acetoacetic ester and hydrolyzing the resulting product. These methods are unsatisfactory in that the latter is expensive and the former results in an impure product.

It is an object of this invention to provide a new process for the preparation of levulinic acid and homologues of levulinic acid. A further object is to prepare levulinic acid from dihalogenbutenes. A still further object is to prepare and isolate intermediate compounds formed in the synthesis of levulinic acid from dihalogenbutenes. Other objects will appear hereinafter.

These objects are accomplished by converting a dihalogen-2,4-butene-2 into a halogen-2-cyano-4-butene-2 by treatment with a soluble and ionizable cyanide such as an alkali cyanide, hydrolyzing the halogen-2-cyano-4-butene-2 to a halogen-2-pentene-3-oic acid, treating the halogen-2-pentene-3-oic acid with a strong non-oxidizing oxygen acid, such as sulfuric acid, and hydrolyzing the resultant product to levulinic acid.

In the preferred embodiment of the invention, dichloro-2,4-butene-2 is reacted with sodium cyanide in alcoholic solution. The resulting chloro-2-cyano-4-butene-2 is then hydrolyzed, under the influence of concentrated hydrochloric acid, to chloro-4-pentene-3-oic acid. The latter acid on treatment with concentrated sulfuric acid, followed by hydrolysis, is readily converted to levulinic acid. The intermediate chloro-4-pentene-3-oic acid may be more fully identified by two of its derivatives, the ethyl ester and the anilide.

Details of a typical method for converting a dihalogen-2,4-butene-2 to levulinic acid, via the aforesaid intermediate products, are as follows. It will be understood that these specific details are illustrative and not limitative.

Into aqueous ethanol (160 cc. of ethanol to 70 cc. of water) was introduced 125 g. (1 mole) of dichloro-2,4-butene-2 and 49 g. (1 mole) of sodium cyanide. The reaction mixture was gently refluxed for 4 hours after which it was poured into cold water, washed, separated and dried with anhydrous potassium carbonate. By fractionation there was obtained a 57% yield (66 g.) of chloro-2-cyano-4-butene-2, the compound being identified by analysis for nitrogen (calculated 12.10%, found 11.8%). This compound had the following properties: B. P. 81–83° C./18 mm.;

$$d_4^{20} 1.0702; N_D^{20} 1.4632$$

and $M_R$ 29.74 ($M_R$ calc.=29.54).

A mixture of 133 g. (1.1 mole) of chloro-2-cyano-4-butene-2 with 200 cc. of 37% hydrochloric acid was refluxed for one hour. The reaction mixture was then cooled to room temperature, extracted with ether, and the ether extract fractionated. There was obtained a 78% yield (105 gm.) of chloro-4-pentene-3-oic acid, the compound being identified by a carbon and hydrogen analysis and by determination of its neutralization equivalent. (Calcd. for $C_5H_7O_2Cl$: C, 44.61%; H, 5.20%: neutralization equivalent, 134.5. Found: C, 44.78%; H, 5.25%; neutralization equivalent, 135.5.) This acid had the following properties: B. P. 83–85° C./1 mm.; M. P. 17–18° C.;

$$d_4^{20} 1.2022; N_D^{20} 1.4713$$

$M_R$ 31.29 ($M_R$ calc.=31.34). Chloro-4-pentene-3-oic acid may be further characterized by its ethyl ester (B. P. 81–83° C./15 mm.;

$$d_4^{20} 1.0715; N_D^{20} 1.4502)$$

and by its anilide (M. P. 101° C.). The ester is made by heating 30 gm. of the acid at 100° C. under pressure for 10 hours with a solution of 7 gm. of dry hydrogen chloride in 100 cc. of absolute ethanol. The anilide is made by first preparing the acid chloride (heat 2.6 gm. of the acid for 20 minutes gently with 2.2 gm. of thionyl chloride), heating and stirring the acid chloride for ten minutes with a slight excess of aniline, and crystallizing from aqueous ethanol.

To 33 g. (0.24 mole) of chloro-4-pentene-3-oic acid prepared as above was added slowly with cooling 100 g. of concentrated sulfuric acid. Hydrogen chloride was rapidly evolved and after standing at room temperature during five hours, the reaction mixture was poured onto 300 g. of crushed ice. The solution obtained was subjected to continuous ether extraction, the extract being carefully dried with anhydrous magnesium sulfate. After removal of the ether, 15 g. of material was received from which by distillation there was obtained a 36% yield (10 g.) of levulinic acid, which was identified by its boiling point of 103–106° C./1 mm.; by its melting point of 31–33° C., by its neutralization equivalent of 118 (calcd. 116), and by an elementary analysis which gave 51.33% carbon and 7.24% hydrogen as compared to calculated values of 51.72% and 6.90% respectively.

The invention is illustrated in the above specific description by applying it to dichloro-2,4-butene-2 but as has been stated other dihalogen-2,4-butenes-2 may be likewise employed. Similarly, homologues of these dihalogenbutenes, such as those corresponding to the formula

R—CH₂—C(X)=CH—CH₂(X')

in which X and X' are halogen and R is a hydrocarbon radical and those corresponding to the formula CH₃—C(X)=C(R)—C(X')(R') in which X and X' are halogen and R and R' are hydrogen or hydrocarbon radicals but are never both hydrogen, may be used. The halogen atoms may be chlorine, bromine or iodine and while preferably the same, they may be different. Specific dihalogenbutenes which may be employed in the present invention are dichloro-2,4-butene-2, dibromo-2,4-butene-2, diiodo-2,4-butene-2, chloro-2-bromo-4-butene-2 and bromo-2-chloro-4-butene-2.

The dihalogenbutenes may be prepared as described in a copending application of Carothers and Collins, Serial No. 688,030, filed September 2, 1933. Similarly by the addition of a hydrogen halide to the hydrocarbon substituted monohalogenbutadienes described in Jacobson, U. S. Patent 1,950,440 and Carothers and Coffman, U. S. Patent 1,950,441, it is possible to obtain the homologues of the dihalogenbutenes described above. In general, homologous dihalogenbutenes are formed in the same manner as the dihalogenbutenes themselves, although homologous butadienes do not add the hydrogen halide quite so readily. Further discussion of these inventions will be with particular reference to the dihalogenbutenes themselves, but it is to be understood that the same general considerations are applicable to the homologous dihalogenbutenes.

The dihalogenbutenes, in general, may be reacted with any soluble and ionizable cyanide to produce the nitrile. Thus instead of the sodium cyanide of the above illustration we may use, for example, the cyanide of lithium, ammonium, potassium, or calcium. The reaction is preferably carried out in a liquid in which both the dihalogenbutene and the cyanide are soluble. Thus we may use alcohols or ketones of low molecular weight, or mixtures of these with water.

Any of the nitriles obtainable as described above may be converted, either with or without preliminary isolation and purification, into the corresponding halogen carboxylic acids by any desired method of hydrolysis such as treatment with alkaline saponifying agents, or with steam under pressure, or with mineral acids. Thus, instead of the hydrochloric acid, the use of which is preferred and is illustrated above, we may use, for example, sodium hydroxide or sulfuric acid.

Acids, such as phosphoric acid, may be used instead of sulfuric acid in the step of converting the resulting halogen-4-pentene-3-oic acids. Care should be taken at this point to avoid conditions which are so drastic as to cause charring. The reaction of the sulfuric or other acid may be facilitated by introduction of a suitable catalyst, such as a mercury salt.

It is to be understood, of course, that the conditions under which the above products are prepared, such as temperature, time of heating, proportions of reactants and solvents, and methods of isolation and purifications, may differ widely from those given in the preferred embodiment above without exceeding the scope of the invention. In fact, the conditions given in the examples may often be changed to advantage when other reactants are used. The practical limits of such variations as well as suitable modifications of the procedure given above will be apparent to those skilled in the art. Similarly, the reactants may be brought together at once or one may be added slowly to the other and may be used in molar proportions or with one of them in excess.

Both esters and amides of the halogen-4-pentene-3-oic acids, for example, chloro-4-pentene-3-oic acid, may be made. All esters and amides of these acids are included within the scope of the present invention. They may be prepared from the acids by the methods disclosed above or any other known or suitable methods. The esters of the halogen-4-pentene-3-oic acids may also be prepared directly from halogen-2-cyano-4-butenes-2, for example, chloro-2-cyano-4-butene-2, by treating the nitrile with an alcohol in the presence of a catalyst (hydrogen chloride) and hydrolyzing the imido ester thus obtained. Thus esters of halogen-4-pentene-3-oic acids with methyl, propyl, isopropyl, n-butyl, sec-butyl, isobutyl, heptyl, decyl, lauryl, cetyl, and phenylethyl alcohols or with phenols, such as phenol, cresol, and xylenol may be made. Similarly, amides of these acids may be prepared by reacting the acid or its halide with ammonia or with methyl-, ethyl-, propyl-, butyl-, and lauryl amines, the naphthylamines, the aminophenols, glycine, sarcosine, etc.

It is not necessary to mention here the uses of levulinic acid. Chloro-2-cyano-4-butene-2 and chloro-4-pentene-3-oic acid are both new compounds susceptible of a variety of applications as such and also useful in organic synthesis. The esters and amides of chloro-4-pentene-3-oic acid are useful as solvents, perfume materials, pharmaceuticals, insecticides, etc.

This rapid and convenient method of synthesizing levulinic acid uses as starting material a readily available derivative of vinylacetylene. It has already been pointed out that the process is entirely new and furnishes, if desired, two new and valuable intermediates. The usual methods of preparation of levulinic acid are known to be unsatisfactory in regard to time consumed, cost, quality of product or yield. The present process permits improvement in one or more of these respects.

It is apparent that many widely different embodiments of this invention may be made without departing from the spirit and scope thereof and, therefore, it is not intended to be limited except as indicated in the appended claims.

We claim:

1. In a process for producing levulinic acid and its homologues, the step which comprises reacting a strong non-oxidizing oxygen acid with a member of the group consisting of halogen-4-pentene-3-oic acids and their homologues and then hydrolyzing the resultant product.

2. In a process for producing levulinic acid, the step which comprises reacting sulfuric acid with chloro-4-pentene-3-oic acid and then hydrolyzing the resultant product.

3. In a process for producing levulinic acid which involves converting a dihalogen-2,4-butene-2 into a halogen-2-cyano-4-butene-2, then converting the halogen-2-cyano-4-butene-2 into a halogen-4-pentene-3-oic acid, the step which comprises reacting sulfuric acid with a halogen-4-pentene-3-oic acid and then hydrolyzing the resultant product.

4. In a process for producing levulinic acid which involves converting dichloro-2,4-butene-2 into chloro-2-cyano-4-butene-2, then converting the chloro-2-cyano-4-butene-2 into chloro-4-pentene-3-oic acid, the step which comprises reacting sulfuric acid and chloro-4-pentene-3-oic acid, and then hydrolyzing the resultant product.

5. The process which comprises reacting a member of the group consisting of the dihalogen-2,4-butenes-2 and their homologues with a soluble and ionizable cyanide, hydrolyzing the resulting member of the group consisting of halogen-2-cyano-4-butenes-2 and their homologues to a member of the group consisting of halogen-4-pentene-3-oic acids and their homologues, reacting a strong non-oxidizing oxygen acid with the halogen acid thus obtained, and hydrolyzing the resultant product to a member of the group consisting of levulinic acid and its homologues.

6. The process which comprises reacting a dihalogen-2,4-butene-2 with a soluble and ionizable cyanide in the presence of a solvent for the butene and the cyanide, hydrolyzing the resulting halogen-2-cyano-4-butene-2 to a halogen-4-pentene-3-oic acid, reacting a strong non-oxidizing oxygen acid with the halogen-4-pentene-3-oic acid, and hydrolyzing the resultant product to levulinic acid.

7. The process which comprises reacting dichloro-2,4-butene-2 with an alkali cyanide, hydrolyzing the resulting chloro-2-cyano-4-butene-2 to chloro-4-pentene-3-oic acid, reacting sulfuric acid with the chloro-4-pentene-3-oic acid, and hydrolyzing the resultant product to levulinic acid.

8. The process of claim 2 further characterized in that the sulfuric acid addition takes place in the presence of a mercuric salt catalyst.

9. The process of claim 6 further characterized in that the halogen-2-cyano-4-butene-2 is hydrolyzed by treating it with an alkaline saponifying agent.

10. The process which comprises reacting dichloro-2,4-butene-2 with sodium cyanide in the presence of a solvent for the reactants, converting the chloro-2-cyano-4-butene-2 so formed to chloro-4-pentene-3-oic acid by treatment with hydrochloric acid, reacting the chloro-4-pentene-3-oic acid with sulfuric acid and hydrolyzing the resultant product to levulinic acid.

11. A compound of the general formula $$CH_3-CX=CH-CH_2-COOY$$

in which X is halogen and Y is a member of the group consisting of hydrogen and alcoholic radicals.

12. A halogen-4-pentene-3-oic acid.

13. Chloro-4-pentene-3-oic acid.

14. An ester of a halogen-4-pentene-3-oic acid.

15. An ester of chloro-4-pentene-3-oic acid.

16. The process which comprises reacting a member of the group consisting of the dihalogen-2,4-butenes-2 and their homologues with a soluble and ionizable cyanide, and then hydrolyzing the resulting member of the group consisting of halogen-2-cyano-4-butenes-2 and their homologues to a member of the group consisting of halogen-4-pentene-3-oic acids and their homologues.

17. The process of claim 6 further characterized in that the halogen-2-cyano-4-butene-2 is hydrolyzed by treating it with a mineral acid.

18. The process which comprises reacting dichloro-2,4-butene-2 with sodium cyanide in alcoholic solution, hydrolyzing the resulting chloro-2-cyano-4-butene-2 with concentrated hydrochloric acid, reacting concentrated sulfuric acid with the halogen acid thus obtained, and hydrolizing the resultant product to levulinic acid.

19. In a process for producing levulinic acid, the step which comprises treating chloro-4-pentene-3-oic acid with concentrated sulfuric acid, and then hydrolyzing to produce levulinic acid.

20. The process of claim 6, further characterized in that the halogen-2-cyano-4-butene-2 is hydrolyzed by treating it with steam under pressure.

21. The process which comprises reacting a dihalogen-2,4-butene-2 with a soluble and ionizable cyanide and then hydrolyzing the resulting halogen-2-cyano-4-butene-2 to a halogen-4-pentene-3-oic acid.

22. The process which comprises reacting dichloro-2,4-butene-2 with a soluble and ionizable cyanide and then hydrolyzing the resulting chloro-2-cyano-4-butene-2 to chloro-4-pentene-3-oic acid.

DONALD D. COFFMAN.
ARNOLD M. COLLINS.